United States Patent
Agniel et al.

(10) Patent No.: US 6,797,756 B2
(45) Date of Patent: Sep. 28, 2004

(54) POLYMER COMPOSITION FOR BOTTLE SCREW CAPS

(75) Inventors: Pascal Agniel, Istres (FR); Isabelle Cermelli, Sausset les Pins (FR)

(73) Assignee: BP Chemicals Limited, London (GB)

(*) Notice: Subject to any disclaimer, the term of this patent is extended or adjusted under 35 U.S.C. 154(b) by 75 days.

(21) Appl. No.: 09/860,301

(22) Filed: May 21, 2001

(65) Prior Publication Data

US 2002/0045022 A1 Apr. 18, 2002

Related U.S. Application Data

(63) Continuation of application No. PCT/GB99/03816, filed on Nov. 16, 1999.

(30) Foreign Application Priority Data

Nov. 27, 1998 (FR) .............................. 98 15170

(51) Int. Cl.$^7$ .............................................. C08L 91/06
(52) U.S. Cl. ..................... 524/277; 524/275; 524/62; 524/430; 524/492; 524/366; 428/66.3
(58) Field of Search ................. 524/275, 277, 524/294, 775, 728, 323, 86, 433, 430, 497, 442, 450, 451, 445

(56) References Cited

U.S. PATENT DOCUMENTS

| | | | | |
|---|---|---|---|---|
| 3,923,198 A | | 12/1975 | Brochman ................... 220/359 |
| 3,998,715 A | * | 12/1976 | Bohm et al. ........... 204/159.16 |
| 4,113,679 A | * | 9/1978 | Andrascheck et al. . 260/28.5 D |
| 4,256,234 A | | 3/1981 | Mori et al. .................. 215/343 |
| 4,463,116 A | * | 7/1984 | Koyama et al. ............. 524/232 |
| 4,670,492 A | * | 6/1987 | Nakahara et al. ............ 524/119 |
| 4,680,330 A | * | 7/1987 | Berrier et al. ............... 524/230 |
| 4,701,487 A | * | 10/1987 | Hakim ........................ 524/229 |
| 5,300,545 A | * | 4/1994 | Kazmierczak et al. ...... 524/102 |
| 5,366,645 A | * | 11/1994 | Sobottka ....................... 252/28 |
| 5,381,914 A | * | 1/1995 | Koyama et al. ............. 215/341 |
| 5,482,987 A | * | 1/1996 | Forschirm ................... 524/230 |
| 5,609,679 A | * | 3/1997 | Luers et al. ................. 106/491 |
| H1652 H | * | 6/1997 | Kormelink et al. ......... 508/452 |
| 5,834,079 A | | 11/1998 | Blinka et al. ............... 428/35.7 |
| 6,046,141 A | * | 4/2000 | Kurz et al. .................. 508/100 |
| 6,300,398 B1 | * | 10/2001 | Jialanella et al. ........... 524/275 |
| 6,399,708 B2 | * | 6/2002 | Valligny et al. ............. 525/193 |

FOREIGN PATENT DOCUMENTS

| | | | |
|---|---|---|---|
| EP | 0 526 117 A1 | * 2/1993 | ........... C08L/23/02 |
| WO | WO95/00599 | 1/1995 | |

OTHER PUBLICATIONS

Polyethylene density data from Aldrich Catalogue, 200–2001, p. 1360.*

\* cited by examiner

Primary Examiner—David W. Wu
Assistant Examiner—Rip A. Lee
(74) Attorney, Agent, or Firm—Finnegan, Henderson, Farabow, Garrett and Dunner, L.L.P.

(57) ABSTRACT

A polymer composition, especially used for manufacturing screw caps intended for drinks bottles, which are easy to unscrew and at the same time avoid transmitting a taste and/or a smell to the drinks contained in the bottles. The composition includes (1) a polymer, except a polymer based on a conjugated diene, (2) at least one stabilizer and (3) at least one additive in an amount form 0.01 to 1% by weight, chosen from (a) natural, modified or refined, lignite waxes or montan waxes, (b) polyolefin-based or paraffin-based polar waxes, and (c) refractory or metal oxides grafted by polar organic compounds.

23 Claims, No Drawings

POLYMER COMPOSITION FOR BOTTLE SCREW CAPS

This application is a continuation of international application number PCT/GB99/03816, filed Nov. 16, 1999.

BACKGROUND OF THE INVENTION

The present invention relates to a polymer composition and its use for the manufacture of screw caps for bottles containing, in particular, drinks such as soda and carbonated or uncarbonated, mineral or natural, water.

The technical problem encountered in the use of plastic screw caps intended for bottles containing drinks is often related to the difficulty that the consumer has in unscrewing the cap from the bottle and to the unpleasant taste and unpleasant smell that the cap may give to the drink contained in the bottle. It is known to use a polyethylene composition containing an "amide wax" which is, for example, the product of the reaction of a fatty acid with ammonia, an amine or a diamine. Screw caps manufactured with such a composition are easy to unscrew from the bottle but have the drawback of being able to transfer a taste and/or a smell to the contents of the bottle.

The WO Patent No 95/00599 describes a liner for reclosable container closure containing a lubricating agent such as silicones, fatty acid amines e.g. ethylene bis(stearamide), oleamide and erucamide, metal salts of fatty acids and inorganic materials such as talc, mica, fumed silica and calcium silicate.

The U.S. Pat. No. 4,256,234 describes a container closure having an easy openable liner. More particularly it describes the liner and the olefin resin composition of said liner that contains a conjugated diene polymer. The disclosed composition is used for a liner and not for a plastic screw caps as in the present invention.

The U.S. Pat. No. 5,834,079 describes a film having at least one layer containing a zeolite and an oxygen scavenger. The film layers disclosed in the Patent does not comprise all the components of the present invention composition.

The U.S. Pat. No. 3,923,198 describes a container that is hermetically sealed with an easy opening tape, at least a portion of which opacifies when stressed, providing a visual indication that the closure has been tampered with. The components of the present invention composition are used in different proportions.

A polymer composition used for screw caps for bottles containing drinks such as sodas and carbonated or uncarbonated, mineral or natural, water, which are easy to unscrew and at the same time avoid a taste and/or a smell being transferred to the drinks contained in the bottles, has been found.

SUMMARY OF THE INVENTION

The composition essentially comprises
(1) a polymer except a polymer based on a conjugated diene and
(2) at least one stabilizer chosen from neutralizing agents, short-term antioxidants, long-term antioxidants and UV stabilizers, and
(3) at least one additive in an amount from 0.01 to 1%, preferably from 0.1 to 0.4%, by weight chosen from
   (a) natural, modified or refined lignite waxes or montan waxes,
   (b) polyolefin-based or paraffin-based polar waxes, and
   (c) refractory or metal oxides grafted by polar organic compounds, especially polyalkylene glycol compounds.

DETAILED DESCRIPTION OF THE INVENTION

The polymer may be an ethylene (co)polymer, a propylene (co)polymer or a polyethylene terephthalate (PET), preferably a homopolyethylene or a copolymer of ethylene with at least one $C_3$ to $C_{10}$ alpha-olefin. The ethylene (co)polymer may have a density ranging from 0.930 to 0.965, preferably from 0.948 to 0.955 g/cm$^3$. It may be a copolymer of ethylene with at least one $C_3$ to $C_{10}$ alpha-olefin, especially propylene, 1-butene, 1-hexene, 4-methyl-1-pentene or 1-octene. The polyethylene may have a melt flow index (measured according to the ASTM-D-1238, condition E, standard) ranging from 0.5 to 30, preferably from 1 to 12 g/10 minutes. It may also have a molecular mass distribution width (expressed by the ratio of the weight-average molecular mass, $M_w$, to the number-average molecular mass, $M_n$) ranging from 1.5 to 6, preferably from 2 to 5.

The composition comprises at least one stabilizer chosen from neutralizing agents, short-term antioxidants, long-term antioxidants and UV stabilizers, preferably in an amount ranging from 0.02 to 0.5% by weight.

The neutralizing agent may be chosen from zinc stearate, calcium stearate and zinc oxide, in an amount ranging, for example, from 0 to 0.5%, preferably from 0.05 to 0.5%, by weight.

The short-term antioxidant (also called a secondary antioxidant or so-called "process" antioxidant) may be chosen from phosphorus derivatives such as organophosphorus compounds, especially phosphites, in an amount ranging, for example, from 0 to 0.2%, preferably from 0.02 to 0.2%, by weight. The products sold under the brand name "IRGAFOS 168"® or "IPGAFOS P-EPQ"® manufactured by Ciba Additives may be used.

The long-term antioxidant (also called the primary antioxidant) may be chosen from sterically hindered phenolic compounds and thioesters, such as "IRGANOX 1010"®, "IRGANOX 1076"® or "IRGANOX PS802"® manufactured by Ciba Additives, in an amount ranging, for example, from 0 to 0.2%, preferably from 0.02 to 0.2%, by weight.

The UV stabilizer may be chosen from hindered amines, such as "TINUVIN 622"® manufactured by Ciba Additives, in an amount ranging, for example, from 0 to 0.2%, preferably from 0.02 to 0.2%, by weight.

The composition according to the invention comprises at least one additive which, because of its presence, allows a cap manufactured from the said composition and screwed onto a bottle to be easily unscrewed and which, at the same time, does not transfer significant taste or smell to the drink contained in the bottle.

The additive may be a lignite wax or a montan wax which, in the natural state, is essentially a mixture of $C_{16}$ to $C_{34}$, preferably $C_{22}$ to $C_{32}$, monocarboxylic or dicarboxylic or hydroxycarboxylic acids, of esters of these acids, of $C_{18}$ to $C_{34}$, preferably $C_{22}$ to $C_{32}$, alcohols and of $C_{25}$ to $C_{33}$ aliphatic hydrocarbons. The lignite wax or montan wax may be natural wax or preferably refined wax, that is to say the wax after it has undergone a resin extraction operation (also called deresinification) and/or a bleaching or oxidizing-decoloration operation and/or a saponification operation. As regards montan wax, that sold under the brand name "E Wax"® or "OP Wax"® manufactured by Clariant may be used.

The additive may be a polyolefin-based or paraffin-based polar wax, especially chosen from oxidized polyolefin waxes or Fischer-Tropsch waxes, for example polar waxes of homopolymers or copolymers of a $C_2$ to $C_{10}$ olefin, for example ethylene, propylene or butene, or of a $C_5$ to $C_{10}$ higher alpha-olefin. Polar waxes are generally oxidized waxes which may be obtained by oxidation reactions in the presence of air or oxygen, or by grafting reactions, for example, maleic anhydride grafting reactions. As a polar polyolefin wax, that sold under the brand name "PED 191 Wax"® manufactured by Hoechst may be used.

The additive may be a refractory or metal oxide grafted by polar organic compounds. The refractory or metal oxide may be a magnesium oxide, a zinc oxide, a titanium oxide, a silica, an alumina, an aluminosilicate or a mixture of these oxides. The polar organic compound grafted to the refractory or metal oxide may be any organic compound having one or more oxygen atoms, sulphur atoms, nitrogen atoms, phosphorus atoms and, optionally, halogen, such as fluorine, chlorine, bromine or iodine, atoms. The grafted polar organic compound may preferably be a polyalkylene glycol, such as a polyethylene glycol or a polypropylene glycol, or an ethylene/propylene glycol copolymer. In particular, it is preferred to use a polyethylene glycol. In particular, a silica which is grafted, for example, by a polyethylene glycol and which consists of particles having an average diameter (measured by a "Malvern Mastersizer" with a focal length of 45 mm) from 1 to 10 $\mu$m may be used. The amount of grafted polar organic compound in the refractory or metal oxide may be from 0.1 to 25% by weight. More especially, a silica grafted by a polyethylene glycol, under the brand name "SYLOBLOC K550"® sold by Grace may be used.

The composition may be prepared according to a method in which at least one of the additives and at least one of the stabilizers are added to the polymer in the solid state or in the melt state and are blended with the latter in the solid state or in the melt state. It may be prepared in particular by blending the various constituents together, preferably in an extruder or granulator capable of producing the blend at a temperature above the melting point of the polymer. In this case, the composition is obtained in the form of granules.

The composition may in particular be prepared by blending the polymer with a masterbatch which is a concentrated composition of at least one of the aforementioned stabilizers and of at least one of the aforementioned additives in a polymer like that mentioned above. The composition of the "masterbatch" essentially comprises the same constituents as those of the composition, that is to say:

(1) a polymer except a polymer based on a conjugated diene,
(2) at least one stabilizer chosen from
   (a) neutralizing agents, for example in an amount ranging from 0 to 30%, preferably from 2 to 30%, by weight,
   (b) short-term antioxidants, for example in an amount ranging from 0 to 15%, preferably from 1 to 15%, by weight,
   (c) long-term antioxidants, for example in an amount ranging from 0 to 15%, preferably from 1 to 15%, by weight,
   (d) UV stabilizers, for example in an amount ranging from 0 to 15%, preferably from 1 to 15%, by weight, and
(3) at least one additive in an amount from more than 5 to 25%, by weight, chosen from
   (a) natural, modified or refined lignite waxes or montan waxes,
   (b) polyolefin-based or paraffin-based polar waxes, and
   (c) refractory or metal oxides grafted by polar organic compounds, especially polyalkylene glycol compounds.

In this case, the composition may be prepared using a method in which the masterbatch is added to the polymer in the solid state or in the melt state and is blended with the latter in the solid state or in the melt state.

The composition may also be prepared by blending the polymer with a preblend containing at least one of the stabilizers and at least one of the additives, such as those mentioned above. The composition of the said blend essentially comprises the same constituents as those of the composition, apart from the polymer, that is to say for a total of 100 parts by weight:

(1) from more than 5 to less than 95 parts, preferably from 10 to 90 parts, by weight of at least one stabilizer chosen from
   (a) neutralizing agents,
   (b) short-term antioxidants,
   (c) long-term antioxidants,
   (d) UV stabilizers and
(2) from more than 5 to less than 95 parts, preferably from 10 to 90 parts, by weight of at least one additive chosen from
   (a) natural, modified or refined lignite waxes or montan waxes,
   (b) polyolefin-based or paraffin-based polar waxes, and
   (c) refractory or metal oxides grafted by polar organic compounds, especially polyalkylene glycol compounds.

In this case, the composition may be prepared according to a method in which the preblend is added to the polymer in the solid state or in the melt state and is blended with the latter in the solid state or in the melt state.

The invention also relates to the use of the composition, of the masterbatch or of the preblend in the manufacture of caps intended to be screwed onto plastic bottles containing, in particular, drinks such as sodas and carbonated or uncarbonated, mineral or natural, water.

The invention also relates to the screw caps used for bottles containing drinks and consisting of the composition described above.

The screw caps may be manufactured by an operation of injection-moulding or compression-moulding the composition described above and used either in the form of a blend or in the form of granules. The operation essentially consists in injection-moulding or compression-moulding the composition at a temperature of 170 to 250° C., preferably 200 to 240° C.

EXAMPLES

The following non-limiting examples illustrate the present invention.

In the examples, the compositions are manufactured from an ethylene/1-butene copolymer in powder form, having a density of 951 kg/m$^3$ and a melt flow index (measured according to the ASTM-D-1238, condition E, standard) of 2 g/10 minutes, or else a density of 952 kg/m$^3$ and a melt flow index (measured according to the ASTM-D-1238, condition E, standard) of 11 g/10 minutes. The compositions are extruded at 200° C. using an extruder of the "Werner 53"® brand. The caps are manufactured by an operation of injection-moulding the composition at a temperature of 200° C.

In the following examples, the cap unscrewing torques on PET preforms are measured with an apparatus known by the brand name "Ernst Torque Tester"® manufactured by "Verpackungen A.G.". The caps are screwed on beforehand with a torque of 23 inch.lb. The unscrewing test is carried out after conditioning the caps for one week at 23° C.

In the examples, the taste tests are carried out by a human panel of water tasters (non-smokers) on caps manufactured using the composition. The caps, after prior aeration for half an hour at room temperature, are immersed in a natural mineral water in a clean bottle placed in an oven at 60° C. Next, the water is recovered and diluted twice, four times, eight times and sixteen times by volume with respect to the initial solution using the natural mineral water. Each solution is assigned a rating from 0 to 5, depending on the taste transferred to the water by the cap, the lowest rating being assigned in the case of a substantially non-existent taste.

In the examples, the smell tests are carried out by the same human panel on caps manufactured using the compositions. These caps, after prior aeration for half an hour at room temperature, are put into clean bottles placed in an oven at 80° C. A control specimen, made of additive-free polyethylene and having a smell rating of 0.5, undergoes the same preparation treatment. Next, each specimen is compared with the control and a rating is assigned between 0 (no smell) and 2 (strong smell).

Example No. 1

The Additive is a Polar Wax

|  | Comparative composition | Comparative composition based on amide wax | Composition according to the invention |
|---|---|---|---|
| Polymer | ethylene/1-butene copolymer density: 951 kg/m$^3$ MFI(*): 2 g/10 minutes | | |
| Stabilizers (% by weight) | calcium stearate: 0.15% "IRGAFOS 168" ®: 0.1% "TINUVIN 622" ®: 0.05% | | |
| Additive (% by weight) |  | "UNISLIP 1759" ® from Unichema: 0.2% | "PED 191 Wax" ®: 0.2% (**) |
| Unscrewing torque (inch. lb) | 17 | 15 | 15 |
| Taste (rating from 0 to 5) | 1.2 | 2.5 | 1.4 |
| Smell (rating from 0 to 2) | 0.4 | 0.8 | 0.4 |

(*)Measured according to the ASTM-D-1238, condition E, standard.
(**)"PED 191 Wax" ® is a polar polyolefin wax.

Example No. 2

The Additive is a Polar Wax

|  | Comparative composition | Comparative composition based on amide wax | Composition according to the invention |
|---|---|---|---|
| Polymer | ethylene/1-butene copolymer density: 951 kg/m$^3$ MFI(*): 2 g/10 minutes | | |
| Stabilizers (% by weight) | zinc stearate: 0.15% "IRGAFOS 168" ®: 0.08% "IRGANOX 1010" ®: 0.06% | | |
| Additive (% by weight) |  | "UNISLIP 1759" ® from Unichema: 0.2% | "OP Wax" ®: 0.2% (**) |
| Unscrewing torque (inch. lb) | 17 | 15 | 15 |
| Taste (rating from 0 to 5) | 1.2 | 2.5 | 1.5 |
| Smell (rating from 0 to 2) | 0.4 | 0.8 | 0.5 |

(*)Measured according to the ASTM-D-1238, standard.
(**)"OP Wax" ® is a montan wax.

Example No. 3

The Additive is a Grafted Silica

|  | Comparative composition | Comparative composition based on amide wax | Composition according to the invention |
|---|---|---|---|
| Polymer | ethylene/1-butene copolymer density: 952 kg/m$^3$ MFI(*): 11 g/10 minutes | | |
| Stabilizers (% by weight) | calcium stearate: 0.15% "IRGAFOS 168" ®: 0.06% "IRGANOX 1010" ®: 0.04% "TINUVIN 622" ®: 0.05% | | |
| Additive (% by weight) |  | "UNISLIP 1759" ® from Unichema: 0.2% | "SYLOBLOC K550" ®: 0.3% (**) |
| Unscrewing torque (inch. lb) | 17 | 15 | 15.5 |
| Taste (rating from 0 to 5) | 1 | 2.5 | 1.5 |
| Smell (rating from 0 to 2) | 0.4 | 0.8 | 0.5 |

(*)Measured according to the ASTM-D-1238 standard.
(**)"SYLOBLOC K550" ® is a silica grafted by a polyethylene glycol.

What is claimed is:

1. A polymer composition for use in screw caps intended for drinks bottles, said polymer composition consisting essentially of:
   (1) an ethylene (co)polymer selected from the group consisting of homopolyethylene and a copolymer of ethylene with at least one $C_3$ to $C_{10}$ alpha-olefin, said ethylene (co)polymer having a density of 0.948 to 0.965 g/cm$^3$ and a melt flow index (measured according to ASTM-D-1238, condition E, standard) of 0.5 to 30 g/10 minutes;
   (2) at least one stabilizer selected from the group consisting of neutralizing agents, short-term antioxidants, long-term antioxidants and UV stabilizers; and
   (3) at least one additive in an amount from 0.01 to 1% by weight selected from the group consisting of
      (a) natural, modified or refined lignite waxes or montan waxes,
      (b) polyolefin-based or paraffin-based polar waxes, and
      (c) refractory or metal oxides grafted by a polyalkylene glycol,
wherein said polymer composition does not include a polymer based on a conjugated diene.

2. The polymer composition of claim 1, wherein at least one of the stabilizers is present man amount from 0.02 to 0.5% by weight.

3. The polymer composition of claim 1, wherein the neutralizing agent is selected from the group consisting of zinc stearate, calcium stearate and zinc oxide, and is present in an amount from 0 to 0.05% by weight.

4. The polymer composition of claim 1, wherein the short-term antioxidant is a phosphorus derivative and is present in an amount from 0 to 0.2% by weight.

5. The polymer composition of claim 4, wherein the short-term, antioxidant is an organophosphorus compound.

6. The polymer composition of claim 4, wherein the short-term antioxidant is a phosphite.

7. The polymer composition of claim 1, wherein the long-term antioxidant is selected from the group consisting of sterically hindered phenolic compounds and thioesters and is present in an amount from 0 to 0.2% by weight.

8. The polymer composition of claim 1, wherein the UV stabilizer is a hindered amine and is present in an amount from 0 to 0.2% by weight.

9. The polymer composition of claim 1, wherein the additive is a lignite wax or a montan wax which, in the natural state, essentially consists of $C_{16}$ to $C_{34}$ monocarboxylic, dicarboxylic or hydroxycarboxylic acids, esters of these acids, $C_{16}$ to $C_{34}$ alcohols and, $C_{25}$ to $C_{33}$ aliphatic hydrocarbons.

10. The polymer composition of claim 1, wherein the additive is a polar wax selected from the group consisting of oxidized polyolefin waxes and oxidized Fischer-Tropsch waxes.

11. The polymer composition of claim 1, wherein the additive is a polar wax of a $C_2$ to $C_{10}$ olefin homopolymer or copolymer.

12. The polymer composition of claim 1, wherein the additive is a refractory or metal oxide drafted by a polyalkylene glycol in which additive the refractory or metal oxide is selected from the group consisting of magnesium oxide, zinc oxide, titanium oxide, a silica, an alumina, an aluminosilicate and a mixture of these oxides.

13. The polymer composition of claim 1, wherein the polyalkylene glycol of (c) has one or more oxygen, sulphur, nitrogen, phosphorus and halogen atoms.

14. The polymer composition of claim 1, wherein the polyalkylene glycol of (C) is a polyethylene glycol.

15. Screw caps used for bottles containing drinks and consisting of the polymer composition of claim 1.

16. The polymer composition of claim 1, wherein the melt flow index of the ethylene (co)polymer is from 1 to 12 g/10 minutes.

17. A polymer composition for use in screw caps intended for drinks bottles, said polymer composition consisting essentially of:
(1) an ethylene (co)polymer selected from the group consisting of homopolyethylene and a copolymer of ethylene with at least one $C_3$ to $C_{10}$ alpha-olefin, said ethylene (co)polymer having a density of 0.948 to 0.965 g/cm$^3$ and a melt flow index (measured according to the ASTM-D-1238, condition E, standard) of 0.5 to 30 g/10 minutes;
(2) a hindered amine in an amount of from 0.02 to 0.2% by weight as a UV stabilizer; and
(3) at least one additive in an amount from 0.01 to 1% by weight selected from the group consisting of
  (a) natural, modified or refined lignite waxes or montan waxes,
  (b) polyolefin-based or paraffin-based polar waxes, and
  (c) refractory or metal oxides grafted by a polyalkylene glycol,
wherein said polymer composition does not include a polymer based on a conjugated diene.

18. A polymer composition for use in screw caps intended for drinks bottles, said polymer composition comprising:
(1) an ethylene (co)polymer selected from the group consisting of homopolyethylene and a copolymer of ethylene with at least one $C_3$ to $C_{10}$ alpha-olefin, said ethylene (co)polymer having a density of 0.930 to 0.965 g/cm$^3$ and a melt flow index (measured according to the ASTM-D-1238, condition E, standard) of 0.5 to 30 g/10minutes;
(2) at least one stabilizer selected from the group consisting of neutralizing agents, short-term antioxidants, long-term antioxidants and UV stabilizers; and
(3) from 0.01 to 1% by weight of a refractory or metal oxide grafted by a polyalkylene glycol,
wherein said polymer composition does not include a polymer based on a conjugated diene.

19. The polymer composition of claim 18, wherein the refractory or metal oxide is selected from the group consisting of magnesium oxide, zinc oxide, titanium oxide, a silica, an alumina, an aluminosilicate and a mixture of these oxides.

20. The polymer composition of claim 18, wherein the polyalkylene glycol has one or more oxygen, sulphur, nitrogen, phosphorus and halogen atoms.

21. The polymer composition of claim 18, wherein the polyalkylene glycol is a polyethylene glycol.

22. A polymer composition for use in screw caps intended for drinks bottles, said polymer composition comprising:
(1) an ethylene (co)polymer selected from the group consisting of homopolyethylene and a copolymer of ethylene with at least one $C_3$ to $C_{10}$ alpha-olefin, said ethylene (co)polymer having a density of 0.930 to 0.965 g/cm$^3$ and a melt flow index (measured according to ASTM-D-1238, condition E, standard) of 0.5 to 30 g/10 minutes;
(2) at least one stabilizer selected from the group consisting of neutralizing agents, short-term antioxidants, long-term antioxidants and UV stabilizers; and
(3) from 0.01 to 1% by weight of natural, modified or refined lignite waxes or montan waxes,
wherein said polymer composition does not include a polymer based on a conjugated diene.

23. The polymer composition of claim 22, wherein the lignite waxes or montan waxes, in the natural state, essentially consist of $C_{16}$ to $C_{34}$ monocarboxylic, dicarboxylic or hydroxycarboxylic acids, esters of these acids, $C_{16}$ to $C_{34}$ alcohols and, $C_{25}$ to $C_{33}$ aliphatic hydrocarbons.

* * * * *